United States Patent Office 3,534,891
Patented Oct. 20, 1970

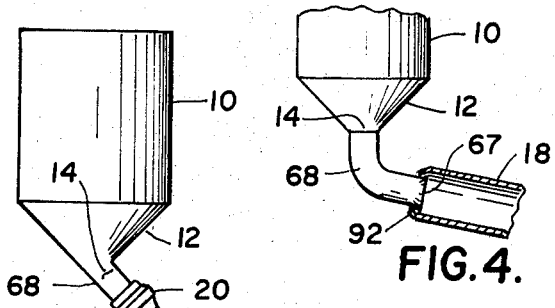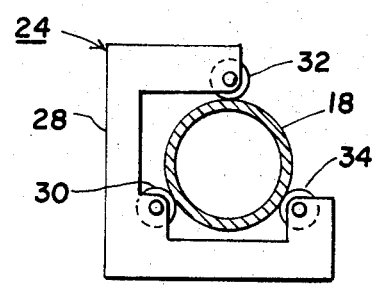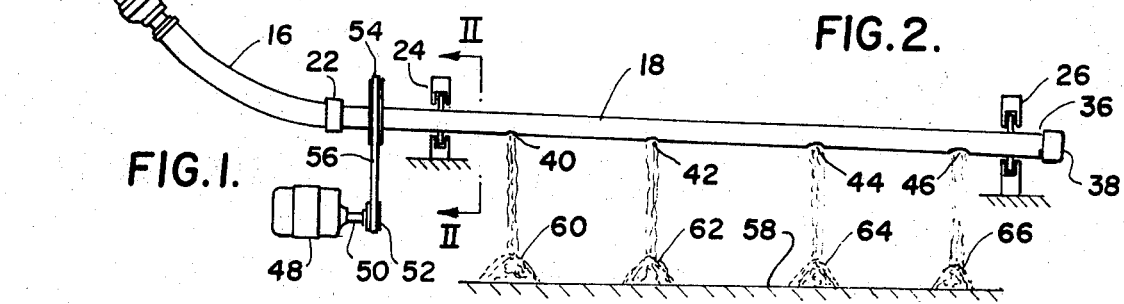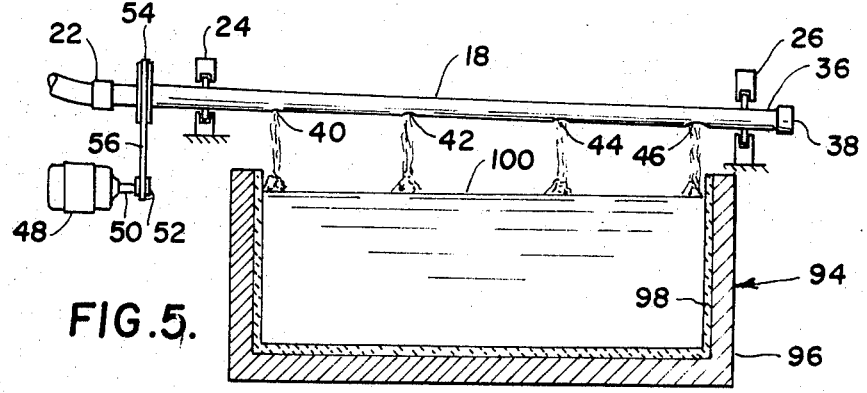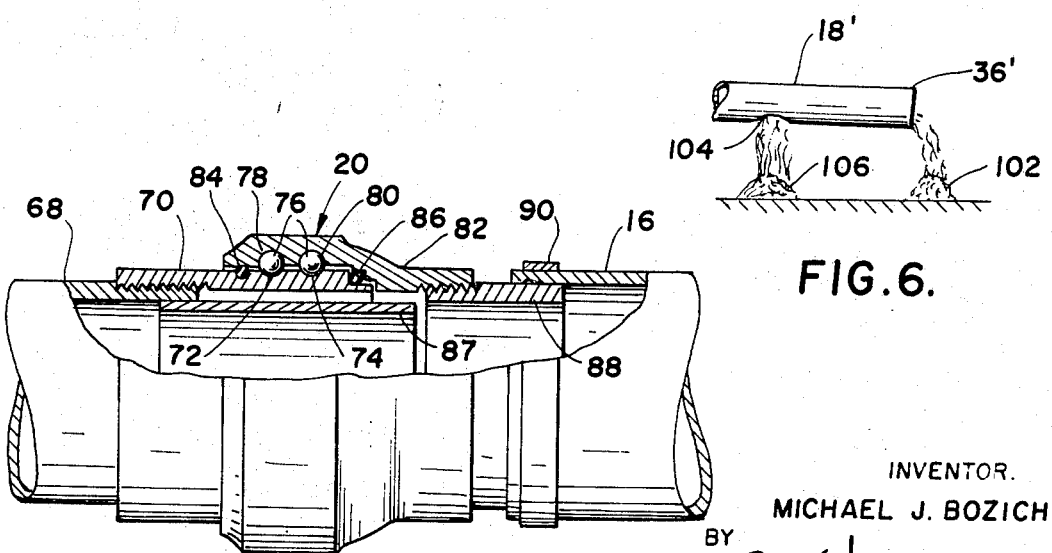

3,534,891
DISTRIBUTOR FOR GRANULAR MATERIALS
Michael J. Bozich, 1059 Bayridge Ave.,
Pittsburgh, Pa. 15226
Filed Apr. 5, 1967, Ser. No. 628,716
Int. Cl. B67b 1/22
U.S. Cl. 222—478                                    7 Claims

ABSTRACT OF THE DISCLOSURE

A system is described for distributing finely divided materials from a supply means onto a receiving surface in aligned discrete piles. A conveying conduit with its axis extending downwardly away from the supply means has a plurality of aligned openings extending along its length. Upon rotation of the conveying conduit by a motor operatively connected to the conduit, the finely divided materials move along the conduit and fall through the openings onto the receiving surface.

BACKGROUND OF THE INVENTION

Field of the invention

This invention relates to distributing systems for granular or powdered materials, and more particularly to a system for distributing such materials into a plurality of aligned discrete piles.

Description of the prior art

The patent to Bozich, U.S. Pat. No. 3,115,369, issued Dec. 24, 1963, discloses a system for feeding finely divided materials contained in a hopper into a conveying conduit as well as a system for discharging the materials from the conveying conduit into one or more receiving bins. In these systems, the material in the hopper is forced through its discharge opening into the conveying conduit by means of air pressure, and the movement of the material in the conveying conduit is effected by air pressure supplied to the conduit anteriorly from its connection with the hopper. The discharge end of the conveying conduit is provided with one or more axially-extending slots in its bottom surface, each of which is positioned above a receiving bin. The arrangement is such that a portion of the materials traveling trhough the conveying conduit will drop into each bin through its associated slot in the conveying conduit. This arrangement, while suitable for its intended purpose, cannot be utilized in all applications, particularly where the material is to be discharged onto exposed surfaces rather than into bins and where the air pressure discharged into the surrounding atmosphere by the system would be disruptive of other operations in its immediate vicinity.

Although not limited thereto, the present invention finds utility in the production of aluminum. In the process for the production of aluminum, purified aluminum oxide in the form of a finely divided powder is dissolved in molten cryolite and electrolyzed with direct current. The mixture is contained in a carbon-lined steel box which acts as a cathode while carbon rods or blocks dipping into the molten bath form the anode. Under the influence of the current, the oxygen of the aluminum oxide is deposited upon the anode, which is thereby burned, while the molten aluminum is deposited on the carbon lining of the cell (cathode). Since molten aluminum is slightly heavier than molten cryolite at the operating temperature (about 950° C.), the metal accumulates in the bottom of the cell. As the molten metal is removed from time-to-time, additional aluminum oxide is stirred into the electrolyte.

In adding the finely divided aluminum oxide to the molten cryolite, care must be taken to prevent too large an accumulation or pile of the aluminum oxide from being deposited in any one area. A large pile deposited onto the cryolite will only partially dissolve and sink to the bottom of the cell, thereby forming an insulating layer on the lining of the cell and reduce the efficiency of the cell. In order to prevent too large a pile of aluminum oxide from being deposited in any one area, the aluminum oxide must be distributed over the surface of the molten cryolite. Furthermore, the oxide must be added to the surface of the molten bath gently and without excessive turbulence, meaning that a conventional pneumatic conveying system, wherein particulate materials are blown under air pressure, is unsatisfactory for this purpose.

SUMMARY OF THE INVENTION

Briefly, the present invention is directed to a system for distributing finely divided materials onto a receiving surface in discrete piles. A conduit is rotatably connected to a bin or storage compartment containing the finely divided materials and includes a plurality of openings therein for discharge of the materials therefrom. A motor is operatively connected to the conduit and rotates the conduit. Upon rotation of the conduit, the materials are moved therealong and are discharged through the openings contained therein and are deposited onto a receiving surface in discrete piles.

The present invention, therefore, is directed to a system which permits the distribution of finely divided materials stored in a container to a location removed therefrom without the use of air pressure. It also permits the even distribution of the materials in aligned discrete piles on a receiving surface.

Accordingly, a primary object of the present invention is to provide a system for distributing finely divided materials from a storage container to a location remote therefrom without the use of air pressure.

Another object of the present invention is to provide a system for distributing finely divided materials in aligned discrete piles on a receiving surface.

The above and other objects and features of the invention will become apparent from the following detailed description taken in connection with the accompanying drawings which form a part of this specification, and in which:

FIG. 1 is a diagrammatic side elevation of the distributing system of the present invention;

FIG. 2 is a cross-sectional view taken along line II—II of FIG. 1;

FIG. 3 is a cross-sectional view of one type of swivel joint that may be utilized in the distributing system shown in FIG. 1;

FIG. 4 illustrates an alternative means for feeding granular materials into a conveying conduit without the need for a swivel joint;

FIG. 5 is a partial diagrammatic side elevational view of the distributing system of the present invention as positioned above a diagrammatic representation of a steel box used in the production of aluminum; and FIG. 6 is a side elevational view of an embodiment of the invention wherein the end of the conveying conduit is open.

DESCRIPTION OF THE PREFERRED EMBODIMENT

Referring now to the drawings, and particularly to FIG. 1, the material distributing system consists of a supply compartment or bin 10 containing the finely divided materials to be distributed. Bin 10 has been shown diagrammatically but it is to be understood that this bin is provided with a removable lid or open top to permit granular or powdered material to be poured therein. The bin 10 has a generally funnel-shaped bottom 12 with an opening at its vertex 14 for introducing the contents of the bin into a coupling conduit 16. Coupling conduit 16 may consist of a flexible hose of rubber, for example, having a passageway therethrough for delivering the finely divided materials to a conveying conduit 18. The coupling conduit 16 is connected to the bin 10 by means of a swivel joint 20, hereinafter described in detail.

Conveying conduit 18 is suitably connected to coupling conduit 16 by means of connector 22. The conveying conduit 18 is rotatably mounted on a pair of C-frame bearing assemblies 24 and 26 with assembly 26 being mounted at a lower elevation than assembly 24, thereby causing the axis of conduit 18 to extend downwardly in a direction away from bin 10.

The C-frame bearing assemblies 24 and 26 are similar and are illustrated in FIG. 2. Assembly 24 consists of a C-shaped frame 28 having rollers 30, 32 and 34 mounted for rotation thereon as illustrated. Rollers 30, 32 and 34, in turn, rotatably support conveying conduit 18. In the embodiment shown, the end 36 of conveying conduit 18 is closed by cap 38, thereby preventing the materials from passing out of the end 36. As will be seen, however, the end may be open, depending upon requirements.

In order to distribute the materials into aligned discrete piles, conveying conduit 18 has a series of aligned openings or ports 40, 42, 44 and 46 which extend longitudinally along the conduit 18. The ports 40, 42, 44 and 46, respectively, progressively increase in size in a direction away from the supply means or bin 10. While only four ports have been illustrated, it is to be understood that any number may be employed, the number of openings being dependent upon need. Furthermore, while all openings are shown herein as being aligned, they may be circumferentially spaced around the periphery of conduit 18 at spaced points along its length.

Operatively connected to conveying conduit 18 is a motor 48. Mounted on the end of shaft 50 of motor 48 is a pulley 52; and mounted on conveying conduit 18 is another pulley 54. Pulley 52 is connected to pulley 54 by means of belt 56; and upon energization of motor 48, conveying conduit 18 will be rotated.

In operation, the finely divided materials fall by means of gravity from bin 10, past swivel joint 20 and into coupling conduit 16. As the finely divided materials will not flow as a liquid, they would normally come to rest along the continuous passageway formed by coupling conduit 16 and conveying conduit 18 short of opening 40. Upon energization of motor 48, however, conveying conduit 18 will be rotated and thus will cause the finely divided materials to move along conduit 18 and pass through openings 40, 42, 44 and 46. As the conduit 18 is rotated, the materials therein will be tumbled and more or less aerated, thereby preventing them from resting in a mass. The aeration of the materials and the co-action of the materials with the walls of the conduit 18 will cause the materials to flow downwardly through the conduit 18 and out through the openings 40, 42, 44 and 46. The materials flowing out through the openings 40, 42, 44 and 46 will fall onto receiving surface 58 forming aligned piles 60, 62, 64 and 66 thereon. The rate of feed of the materials onto the receiving surface 58 is dependent upon the slope of the conveying conduit 18 and the rotational speed thereof. Because of the fact that the openings 40, 42, 44 and 46 progressively increase in size in a direction away from the bin 10, a substantially equal amount of the materials will pass through each opening onto the receiving surface 58, thereby forming substantially equal piles of the materials. In order to increase the rate of feed, either the slope of conduit 18 or the rotational speed thereof may be increased.

As a specific example of the invention, the conduit 18 may have a diameter of one and one-half inches and be disposed at an angle of 3° with respect to horizontal. It has been found, however, that an angle of only 1° is sufficient for effective distributing action. For a conduit of the diameter given above, the opening 40 may have a diameter of 5/32 inch with the openings 42 and 44 being progressively larger and the last or largest opening 46 having a diameter of one inch. With this arrangement, the rate of travel of the granular material within conduit 18 is about fifteen inches per minute.

The swivel joint 20 connecting flexible conduit 16 to the bin 10 may be of the type illustrated in FIG. 3. A conduit 68, connected to the opening in the funnel-shaped bottom 12 of bin 10 is threaded into a stationary annular member 70 which forms the upper, non-rotatable portion of the swivel joint. Formed in the annular member 70 are ball races 72 and 74 which receive a double row of ball bearings 76. As shown, the bearings 76 are also received within cooperating races 78 and 80 formed in a lower, annular portion 82 of the swivel joint which rotates with respect to the stationary annular member 70. O-ring seals 84 and 86 are disposed between the rotatable and non-rotatable members 82 and 70, respectively. With this arrangement, the lower member 82 may rotate with respect to the upper stationary member 70, while seals 84 and 86 prevent the escape of granular material and also protect the ball bearings 76.

Force-fitted into the lower end of the conduit 68 leading from bin 10 is a tubular extension 87 having a length such that it extends beyond the bearings 76 and seal 86. In this manner, the extension 87 insures that the granular material will not enter the space between the rotatable and non-rotatable members 82 and 70 and cause fouling or damage to the bearings 76. Threaded into the lower end of the rotatable annular member 82 is a nipple or extension 88 to which the flexible conduit 16 is connected by means of a clamp 90.

Instead of the swivel joint shown in FIG. 3, the arrangement of FIG. 4 may be employed wherein a flared end 67 of conduit 68 simply fits into the pinched or reduced diameter end 92 of the conveying conduit 18. In this case, the flexible conduit 16 will, of course, be eliminated, the material from the bin 10 simply dropping into the forward end of conduit 18.

In FIG. 5 the material distributing system is illustrated as positioned above a steel box 94 utilized in the production of aluminum. Such boxes are usually made of a steel outer casing 96 and lined with carbon as shown at 98. The steel box 94 may, for example, be twenty feet long, six feet wide and three feet deep. In order to evenly distribute aluminum oxide onto the top surface of the molten cryolite 100 contained in the box 94 for the purpose as previously described, the conveying conduit 18 of the present invention need only to be placed above the steel box 94. A plurality of such systems as described may be placed longitudinally along the steel box 94 (i.e., one behind the other going into the plane of the drawing) as needed to add aluminum oxide to the box as the molten aluminum produced is removed therefrom.

In FIG. 6 an alternative embodiment of the invention is shown wherein the end 36' of the conduit 18' is open rather than closed as in FIGS. 1 and 5 whereby granular material will flow from the end of the conduit into a pile 102. If desired, openings such as opening 104 may be provided in the conduit 18' to produce a second pile 106. On the other hand, the opening 104 may be eliminated whereby all of the material will be forced to flow through the open end 36'.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In combination, a source of finely divided materials of essentially uniform grain size, a conveying conduit, supply means for introducing said finely divided materials into said conduit, means for rotatably coupling said conduit to said supply means, means for rotating said conduit, the axis of said conduit extending downwardly and away from said supply means such that rotation of said conduit will cause the finely divided materials to move along the conduit, and a series of ports disposed at spaced points along the length of said conduit, said ports being of such size and progressively increasing in size in a direction away from said supply means whereby upon rotation of said conduit a substantially equal amount of said finely divided materials will pass through each of said ports onto a receiving surface thereby forming a plurality of equal discrete piles of the finely divided materials on said receiving surface.

2. The combination as set forth in claim 1, wherein said series of ports are aligned and spaced along the length of said conduit.

3. The combination as set forth in claim 2, wherein the axis of said conduit extends downwardly and away from said supply means at an angle of about 1°–3° with respect to the horizontal.

4. The combination as set forth in claim 2, wherein said means for rotating said conduit comprises a motor operatively connected to said conduit whereby upon rotation of said conduit by said motor the finely divided materials will be aerated and caused to flow along said conduit, the slope of said conduit and the rotational speed thereof determining the rate of feed of said finely divided materials onto said receiving surface.

5. The combination as set forth in claim 1 wherein said source of finely divided materials comprises aluminum oxide.

6. The combination as set forth in claim 5 including a molten bath of cryolite beneath said conveying and onto which said aluminum oxide falls.

7. The combination as set forth in claim 1 wherein said openings extend only part way around the circumference of said conveying conduit.

References Cited

UNITED STATES PATENTS

| | | | |
|---|---|---|---|
| 991,418 | 5/1911 | Bowers et al. | 209—245 |
| 1,655,753 | 1/1928 | Cole | 222—167 X |
| 1,859,093 | 5/1932 | Jungers | 209—245 X |

ROBERT B. REEVES, Primary Examiner

F. R. HANDREN, Assistant Examiner

U.S. Cl. X.R.

209—245; 222—526; 257—3